United States Patent
Lakhani et al.

(10) Patent No.: US 10,218,954 B2
(45) Date of Patent: *Feb. 26, 2019

(54) VIDEO TO DATA

(71) Applicant: CELLULAR SOUTH, INC., Ridgeland, MS (US)

(72) Inventors: Naeem Lakhani, Croydon (GB); Bartlett Wade Smith, IV, Madison, MS (US); Allison A. Talley, Ridgeland, MS (US)

(73) Assignee: CELLULAR SOUTH, INC., Ridgeland, MS (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/910,698

(22) PCT Filed: Feb. 7, 2015

(86) PCT No.: PCT/US2015/014940
§ 371 (c)(1),
(2) Date: Feb. 6, 2016

(87) PCT Pub. No.: WO2015/120351
PCT Pub. Date: Aug. 13, 2015

(65) Prior Publication Data
US 2016/0358632 A1 Dec. 8, 2016

Related U.S. Application Data

(63) Continuation of application No. 14/175,741, filed on Feb. 7, 2014, now Pat. No. 9,940,972.

(51) Int. Cl.
*G10L 15/00* (2013.01)
*G10L 25/00* (2013.01)
(Continued)

(52) U.S. Cl.
CPC ............. *H04N 9/8715* (2013.01); *H04N 9/80* (2013.01); *H04N 9/802* (2013.01); *G10L 15/26* (2013.01)

(58) Field of Classification Search
CPC ... G01L 5/18; G01L 5/26; G01L 5/265; G10L 25/48; G10L 25/51; G10L 25/54;
(Continued)

(56) References Cited

U.S. PATENT DOCUMENTS 7,536,413 B1 * 5/2009 Mohan ................ G06F 17/3071
9,615,136 B1 * 4/2017 Emery ............. H04N 21/47202
(Continued)

OTHER PUBLICATIONS

Notification Concerning Transmittal of International Preliminary Report on Patentability (Chapter I of the Patent Cooperation Treaty) dated Aug. 18, 2016, issued in International Application No. PCT/US2015/014940.
(Continued)

*Primary Examiner* — Paras D Shah
(74) *Attorney, Agent, or Firm* — Steptoe & Johnson LLP

(57) ABSTRACT

A method and system can generate video content from a video. The method and system can include generating audio files and image files from the video, distributing the audio files and the image files across a plurality of processors and processing the audio files and the image files in parallel. The audio files associated with the video to text and the image files associated with the video to video content can be converted. The text and the video content can be cross-referenced with the video.

18 Claims, 9 Drawing Sheets

Related U.S. Application Data

(60) Provisional application No. 62/021,666, filed on Jul. 7, 2014, provisional application No. 61/866,175, filed on Aug. 15, 2013.

(51) Int. Cl.
*G06F 17/30* (2006.01)
*G06T 7/00* (2017.01)
*H04N 9/87* (2006.01)
*H04N 9/802* (2006.01)
*H04N 9/80* (2006.01)
*G10L 15/26* (2006.01)

(58) Field of Classification Search
CPC ... G10L 25/57; G06F 17/30; G06F 17/30058; G06F 17/3074; G06F 17/30781; G06T 7/0081; G06K 2209/01
USPC ..... 704/231, 270, 270.1, 275; 382/100, 173, 382/176, 177; 345/418; 348/61
See application file for complete search history.

(56) References Cited

U.S. PATENT DOCUMENTS

| | | | | |
|---|---|---|---|---|
| 9,652,477 | B2* | 5/2017 | Balinsky | G06F 17/3028 |
| 2001/0020954 | A1 | 9/2001 | Hull et al. | |
| 2003/0112261 | A1* | 6/2003 | Zhang | G11B 27/22 715/716 |
| 2003/0112265 | A1* | 6/2003 | Zhang | G06F 17/30787 715/723 |
| 2005/0108004 | A1* | 5/2005 | Otani | G10L 25/78 704/205 |
| 2006/0179453 | A1* | 8/2006 | Kadie | G06Q 30/02 725/34 |
| 2006/0212897 | A1* | 9/2006 | Li | H04H 60/58 725/32 |
| 2007/0106685 | A1* | 5/2007 | Houh | G06F 17/30796 |
| 2007/0112630 | A1* | 5/2007 | Lau | G06K 9/72 705/14.1 |
| 2008/0120646 | A1* | 5/2008 | Stern | G06Q 30/02 725/34 |
| 2008/0232696 | A1* | 9/2008 | Kasahara | G06K 9/00664 382/224 |
| 2008/0276266 | A1* | 11/2008 | Huchital | G06Q 30/02 725/32 |
| 2009/0006191 | A1* | 1/2009 | Arankalle | G06Q 30/02 705/14.71 |
| 2009/0006375 | A1* | 1/2009 | Lax | H04N 21/435 |
| 2009/0157407 | A1 | 6/2009 | Yamabe et al. | |
| 2009/0199235 | A1* | 8/2009 | Surendran | G06Q 30/02 725/34 |
| 2011/0069936 | A1 | 3/2011 | Johnson et al. | |
| 2011/0292992 | A1* | 12/2011 | Sirivara | H04N 21/23418 375/240.01 |
| 2012/0254917 | A1* | 10/2012 | Burkitt | G06F 17/30817 725/40 |
| 2013/0174045 | A1 | 7/2013 | Sarukkai et al. | |
| 2014/0314391 | A1* | 10/2014 | Kim | G11B 27/11 386/248 |
| 2015/0019206 | A1* | 1/2015 | Wilder | G06K 9/00302 704/9 |

OTHER PUBLICATIONS

International Search Report dated Jun. 3, 2015, issued in International Application No. PCT/US2015/014940.

Written Opinion of the International Searching Authority dated Jun. 3, 2015, issued in International Application No. PCT/US2015/014940.

Deng, Yining, and B.S. Manjunath, "Content-based search of video using color, texture, and motion." Image Processing, 1997, retrieved from: http:/vision.ece.uc.sb.edu/publications/97ICIPCBS.pdf.

* cited by examiner

VIDEO TO DATA

CLAIM OF PRIORITY

This application claims the benefit under 35 USC 371 to International Application No. PCT/US2015/014940, filed Feb. 7, 2015, which claims priority to U.S. patent application Ser. No. 14/175,741, filed Feb. 7, 2014, which claims priority to U.S. Provisional Patent Application No. 61/866,175, filed on Aug. 15, 2013, and claims priority to U.S. Provisional Patent Application No. 62/021,666, filed Jul. 7, 2014, each of which is incorporated by reference in its entirety.

TECHNICAL FIELD

The present invention relates to a method and a system for generating various and useful data from videos.

BACKGROUND

In the field of image contextualization, distributed reverse image similarity searching can be used to identify images similar to a target image. Reverse image searching can find exactly matching images as well as flipped, cropped, and altered versions of the target image. Distributed reverse image similarity searching can be used to identify symbolic similarity within images. Audio-to-text algorithms can be used to transcribe text from audio. An exemplary application is note-taking software. Audio-to-text, however, lacks semantic and contextual language understanding.

SUMMARY

The present invention is generally directed to a method to generate data from video content, such as text and/or image-related information. A server executing the method can be directed by a program stored on a non-transitory computer-readable medium. The video text can be, for example, a context description of the video.

An aspect of the method can include generating text from an image of the video, converting audio associated with the video to text, extracting topics from the text converted from the audio, cross-referencing the text generated from the image of the video and the topics extracted from audio associated with the video, and generating video text based on a result of the cross-referencing.

In some embodiments, natural language processing can be applied to the generation of text from an image of the video, converting audio associated with the video to text, or both.

In other embodiments, the text from the image of the video can be generated by identifying context, a symbol, a brand, a feature, an object, and/or a topic in the image of the video.

In yet other embodiments, the text from the image can be generated by first segmenting images of the video, and then converting the segments of images to text in parallel. The text from the audio can be generated by first segmenting images of the audio, and then converting the segments of images to text in parallel. The audio can be segmented at spectrum thresholds. The generated text may be of different sizes. The size of the text can be adjusted by a ranking or scoring function that, for example, can adjust the text size based on confidence in the description or relevance to a search inquiry. The text can describe themes, identification of objects or other information of interest.

In some embodiments, the method can include generating advertising and/or product or service recommendations based on video content. The video content can be text, context, symbols, brands, features, objects, and/or topics related to or found in the video. An advertisement and/or product or service recommendations can be placed at a specific time in the video based on the video content and/or section symbol of a video image. The advertisement and/or product or service recommendations can also be placed at a specific time as part of the video player, e.g., side panel, and also may be placed on a second screen. In some embodiments, the method can include directing when one or more advertisements can be placed in a predetermined context at a preferred time.

BRIEF DESCRIPTION OF THE DRAWINGS

The present invention is further described in the detailed description which follows, in reference to the noted plurality of drawings by way of non-limiting examples of certain embodiments of the present invention, in which like numerals represent like elements throughout the several views of the drawings, and wherein.

DETAILED DESCRIPTION

Figure 1:
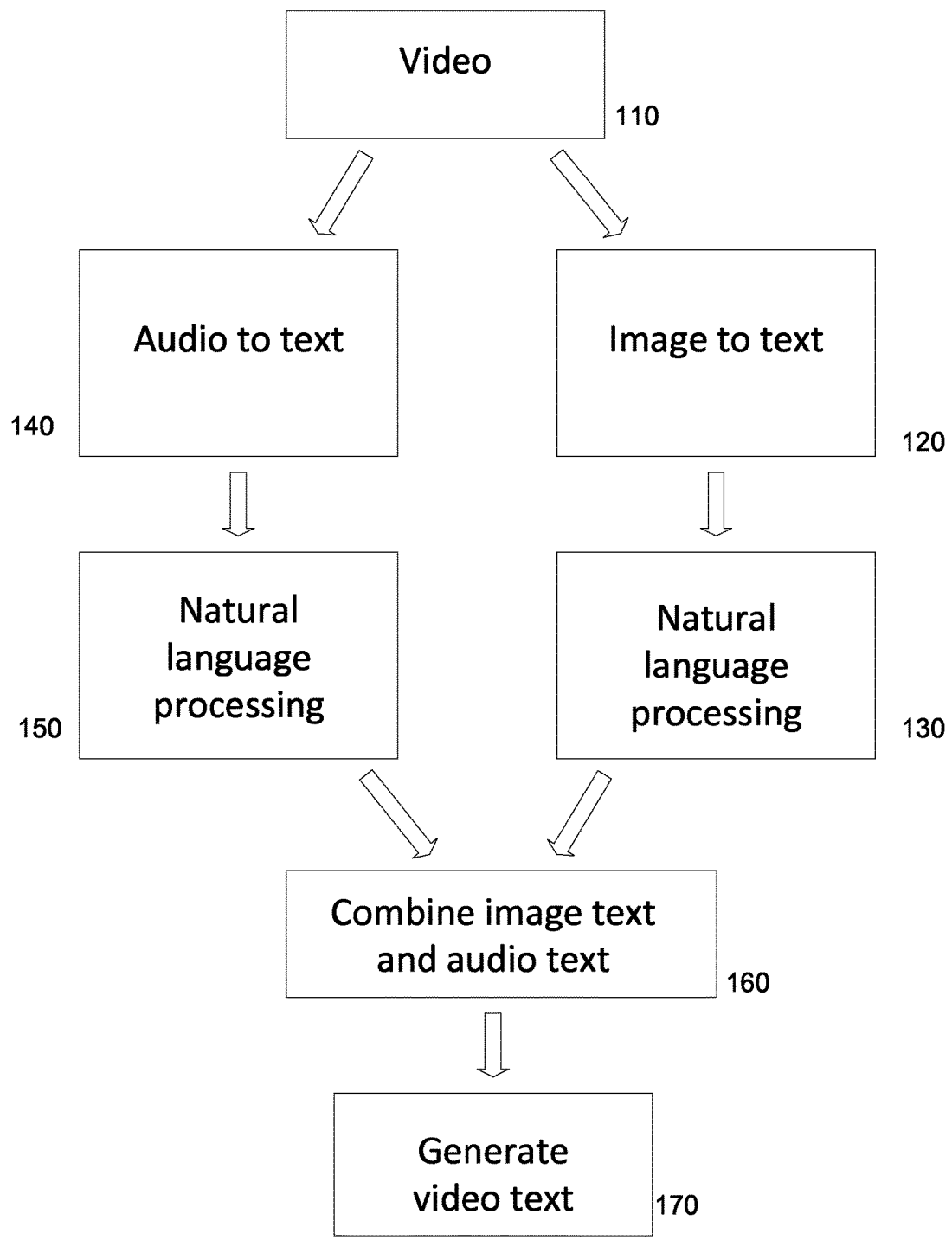
FIG. 1 illustrates an embodiment of present invention.

A detailed explanation of the system and method according to exemplary embodiments of the present invention are described below. Exemplary embodiments described, shown, and/or disclosed herein are not intended to limit the claims, but rather, are intended to instruct one of ordinary skill in the art as to various aspects of the invention. Other embodiments can be practiced and/or implemented without departing from the scope and spirit of the claimed invention.

The present invention is generally directed to system, device, and method of generating content from video files, such as text and information relating to context, symbols, brands, features, objects, faces and/or topics found in the images of such videos. In an embodiment, the video-to-content engine can perform the functions directed by programs stored in a computer-readable medium. That is, the embodiments may take the form of a hardware embodiment (including circuits), a software embodiment, or an embodiment combining software and hardware. The present invention can take the form of a computer-program product that includes computer-useable instructions embodied on one or more computer-readable media.

The various video-to-content techniques, methods, and systems described herein can be implemented in part or in whole using computer-based systems and methods. Additionally, computer-based systems and methods can be used to augment or enhance the functionality described herein, increase the speed at which the functions can be performed, and provide additional features and aspects as a part of or in addition to those described elsewhere in this document. Various computer-based systems, methods and implementations in accordance with the described technology are presented below.

A video-to-content engine can be embodied by the a general-purpose computer or a server and can have an internal or external memory for storing data and programs such as an operating system (e.g., DOS, Windows 2000™, Windows XP™, Windows NT™, OS/2, UNIX or Linux) and one or more application programs. Examples of application programs include computer programs implementing the techniques described herein for lyric and multimedia customization, authoring applications (e.g., word processing programs, database programs, spreadsheet programs, or graphics programs) capable of generating documents or other electronic content; client applications (e.g., an Internet Service Provider (ISP) client, an e-mail client, or an instant messaging (IM) client) capable of communicating with other computer users, accessing various computer resources, and viewing, creating, or otherwise manipulating electronic content; and browser applications (e.g., Microsoft's Internet Explorer) capable of rendering standard Internet content and other content formatted according to standard protocols such as the Hypertext Transfer Protocol (HTTP). One or more of the application programs can be installed on the internal or external storage of the general-purpose computer. Alternatively, application programs can be externally stored in or performed by one or more device(s) external to the general-purpose computer.

The general-purpose computer or server may include a central processing unit (CPU) for executing instructions in response to commands, and a communication device for sending and receiving data. One example of the communication device can be a modem. Other examples include a transceiver, a communication card, a satellite dish, an antenna, a network adapter, or some other mechanism capable of transmitting and receiving data over a communications link through a wired or wireless data pathway.

The general-purpose computer or server may also include an input/output interface that enables wired or wireless connection to various peripheral devices. In one implementation, a processor-based system of the general-purpose computer can include a main memory, preferably random access memory (RAM), and can also include a secondary memory, which may be a tangible computer-readable medium. The tangible computer-readable medium memory can include, for example, a hard disk drive or a removable storage drive, a flash based storage system or solid-state drive, a floppy disk drive, a magnetic tape drive, an optical disk drive (Blu-Ray, DVD, CD drive), magnetic tape, paper tape, punched cards, standalone RAM disks, Iomega Zip drive, etc. The removable storage drive can read from or write to a removable storage medium. A removable storage medium can include a floppy disk, magnetic tape, optical disk (Blu-Ray disc, DVD, CD) a memory card (CompactFlash card, Secure Digital card, Memory Stick), paper data storage (punched card, punched tape), etc., which can be removed from the storage drive used to perform read and write operations. As will be appreciated, the removable storage medium can include computer software or data.

In alternative embodiments, the tangible computer-readable medium memory can include other similar means for allowing computer programs or other instructions to be loaded into a computer system. Such means can include, for example, a removable storage unit and an interface. Examples of such can include a program cartridge and cartridge interface (such as the found in video game devices), a removable memory chip (such as an EPROM or flash memory) and associated socket, and other removable storage units and interfaces, which allow software and data to be transferred from the removable storage unit to the computer system.

An embodiment of video-to-content engine operation is illustrated in FIG. 1. At 110, a video stream is presented. The video stream may be in format of (but not limited to): Advanced Video Codec High Definition (AVCHD), Audio Video Interlaced (AVI), Flash Video Format (FLU), Motion Picture Experts Group (MPEG), Windows Media Video (WMV), or Apple QuickTime (MOV), h.264 (MP4).

The engine can extract audio data and image data (e.g. images or frames forming the video) from the video stream.

In some embodiments, the video stream and the extracted image data can be stored in a memory or storage device such as those discussed above. A copy of the extracted image data can be used for processing.

Figure 2:
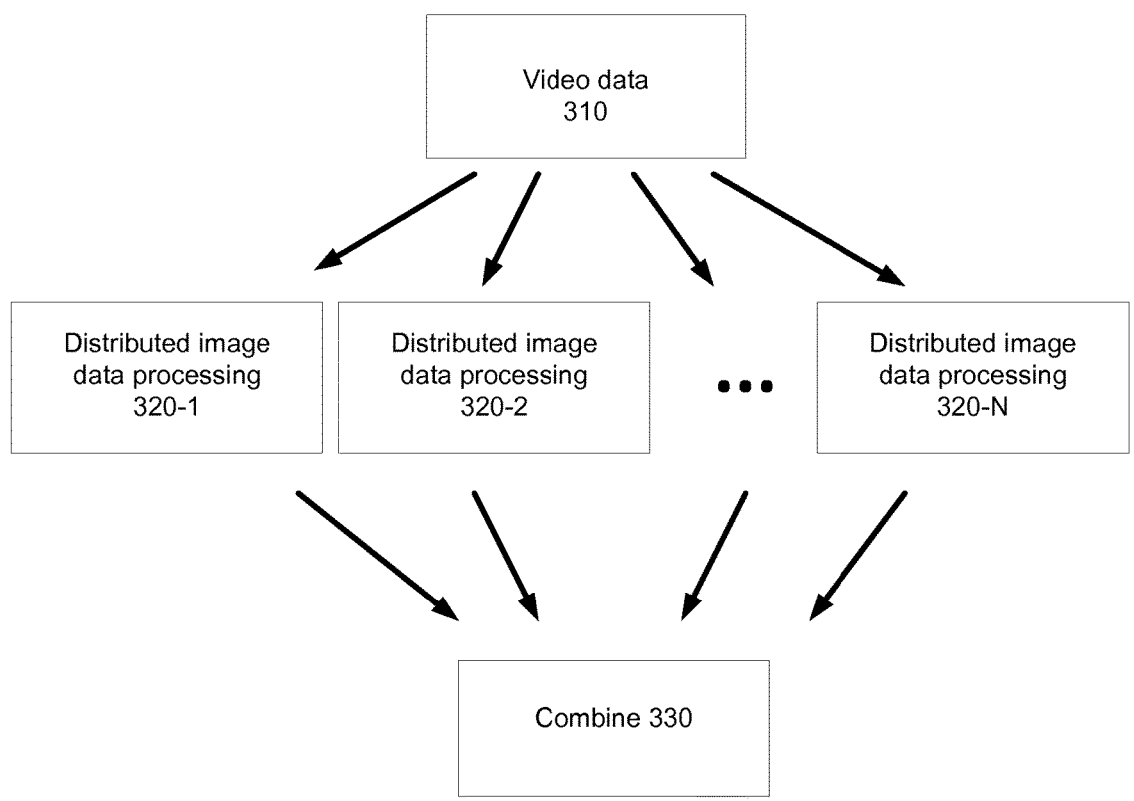
FIG. 2 illustrates an embodiment of image data processing.

At 120, the video-to-content engine performs an image data processing on the video stream. An example of the image data processing is illustrated in FIG. 2. In FIG. 2, the image data 310 can be segmented into N segments and processed in parallel (e.g., distributed processing 320-1 to 320-N), allowing for near real-time processing.

An example of the video image data processing can be symbol (or object) based. Using image processing technique such as color edge detection, a symbol of a screen or an image of the video can be isolated. The symbol can be identified using an object template database. For example, the symbol includes 4 legs and a tail, and when matched with the object template database, the symbol may be identified as a dog. The object template database can be adaptive and therefore, the performance would improve with usage.

Other image data processing techniques may include image extraction, high-level vision and symbol detection, figure-ground separation, depth and motion perception.

Another example of video image processing can be color segmentation. The colors of an image (e.g., a screen) of the video can be segmented or grouped. The result can be compared to a database using color similarity matching.

Based on the identified symbol, a plurality of instances of the symbol can be compared to a topic database to identify a topic (such as an event). For example, the result may identify the dog (symbol) as running or jumping. The topic database can be adaptive to improve its performance with usage.

Figure 9:
FIG. 9 illustrates an embodiment of a graphical user interface of the present invention.

Thus, using the processing example above, text describing a symbol of the video and topic relating to the symbol may be generated, as is illustrated in FIG. 9. Data generated from an image and/or from audio transcription can be time stamped, for example, according to when it appeared, was heard, and/or according to the video frame from which it was pulled.

At 330, the engine combines the topics as an array of keys and values with respect to the segments. The engine can segment the topics over a period of time and weight the strength of each topic. Further, the engine applies the topical meta-data to the original full video. The image topics can be stored as topics for the entire video or each image segment. The topic generation process can be repeated for all identifiable symbols in a video in a distributed process. The outcome would be several topical descriptors of the content within a video. An example of the aggregate information that would be derived using the above example would be understanding that the video presented a dog, which was jumping, on the beach, with people, by a resort.

Identifying various objects in an image can be a difficult task. For example, locating (segmenting) and positively identifying an object in a given frame or image can yield false positives—locating but wrongfully identifying an object. Therefore, present embodiments can be utilized to eliminate false positives, for example, by using context. As one example, if the audio soundtrack of a video is an announcer calling a football game, then identification of ball in a given frame as a basketball can be assigned a reduced probability or weighting. As another example of using context, if a given series of image frames from a video is positively or strongly identified as a horse race, then identifying an object to be a mule or donkey can be given a reduced weight.

Using the context or arrangement of certain objects in a given still or static image to aid in computer visual recognition accuracy can be an extremely difficult task given certain challenges associated with partially visible or self-occluded objects, lack of objects, and/or faces, and/or words or an overly cluttered image, etc. However, the linear sequencing of frames from a video—as opposed to a stand-alone image—avails itself to a set images {images x-y} from which context can be derived. This contextual methodology can be viewed as systematic detection of probable image false positives by identifying an object from one video frame (or image) as an anomaly when compared to and associated with a series of image frames both prior and subsequent to the purported anomaly. According to the objects, faces, words, etc. of a given set of frames (however defined), a probability can be associated with an identified anomaly to determine whether an image may be a false positive and, if so, what other likely results should be.

In certain instances, identification of an individual can be a difficult task. For example, facial recognition can become difficult when an individual's face is obstructed by another object like a football, a baseball helmet, a musical instrument, or other obstructions. An advantage of some embodiments described herein can include the ability to identify an individual without identification of the individual's face. Embodiments can use contextual information such as associations of objects, text, and/or other context within an image or video. As one example, a football player scores a touchdown but rather than identifying the player using facial recognition, the player can be identified by object recognition of, for example, the player's team's logo, text recognition of the player's jersey number, and by cross referencing this data with that team's roster (as oppose to another team, which is an example of why the logo recognition can be important). Such embodiments can further learn to identify that player more readily and save his image as data.

Similarly, the audio transcript of a video can be used to derive certain context helpful in identifying and correcting or eliminating image false positives. In this way, an image anomaly or anomalies identified in a given video frame(s) are associated with time (time stamped) and correlated with a time range from the transcribed audio to establish certain probabilities of accuracy.

Moreover, the aforementioned methodologies—establishing probabilities of accuracy of image identification from a set of frames and from the audio transcription—can be combined to improve the results.

In some embodiments, a similar context methodology can be used to identify unknown objects in a given image by narrowing a large, or practically infinite, number of possibilities to a relatively small number of object possibilities and assigning probabilities. For example, neuro-linguistic programming (NLP), neural network programming, or deep neural networks can be utilized to achieve sufficient narrowing and weighting. For further example, based on a contextual review of a large number of objects over a period of time, a series of nodes in parallel and/or in series can be developed by the processor. Upon initial recognition of objects and context, these nodes can assign probabilities to the initial identification of the objection with each node in turn using context and further description to narrow the probabilistic choices of an object. Other methodologies can be utilized to determine and/or utilize context as described herein.

Natural language processing can be useful in creating an intuitive and/or user-friendly computer-human interaction. In some embodiments, the system can select semantics or topics, following certain rules, from a plurality of possible semantics or topics, can give them weight based on strength of context, and/or can do this a distributed environment. The natural language processing can be augmented and/or improved by implementing machine-learning. A large training set of data can be obtained from proprietary or publicly available resources. For example, CBS News maintains a database of segments and episodes of "60-Minutes" with full transcripts, which can be useful for building a training set and for unattended verification of audio segmentation. The machine learning can include ensemble learning based on the concatenation of several classifiers, i.e. cascade classifiers.

At 130, an optional step of natural language processing can be applied to the image text. For example, based on dictionary, grammar, and a knowledge database, the text extracted from video images can be modified as the video-to-content engine selects primary semantics from a plurality of possible semantics. In some embodiments, the system and method can incorporate a Fourier transform of the audio signal. Such filtering can improve silence recognition, which can be useful for determining proper placement of commas and periods in the text file.

In parallel, at 140, the video-to-content engine can perform audio-to-text processing on audio data associated with the video. For example, for a movie video, the associated audio may be the dialog or even background music.

In addition to filtering of the audio signal, images from the video signal can be processed to address, for example, the problem of object noise in a given frame or image. Often images are segmented only to locate and positively identify one or very few main images in the foreground of a given frame. The non-primary or background images are often treated as noise. Nevertheless, these can provide useful information, context and/or branding for two examples. To fine-tune the amount of object noise cluttering a data set, it can be useful to provide a user with an option to dial image detection sensitivity. For certain specific embodiments, identification of only certain clearly identifiable faces or large unobstructed objects or band logos can be required with all other image noise disregarded or filtered, which can require less computational processing and image database referencing, in turn reducing costs. However, it may become necessary or desirable to detect more detail from a frame or set of frames. In such circumstances, the computational thresholds for identification of an object, face, etc. can be altered according to a then stated need or desire for non-primary, background, obstructed and/or grainy type images. Such image identification threshold adjustment capability can be implemented, for example, as user-controlled interface, dial, slider, or button, which enables the user to make adjustments to suit specific needs or preferences.

Figure 3:
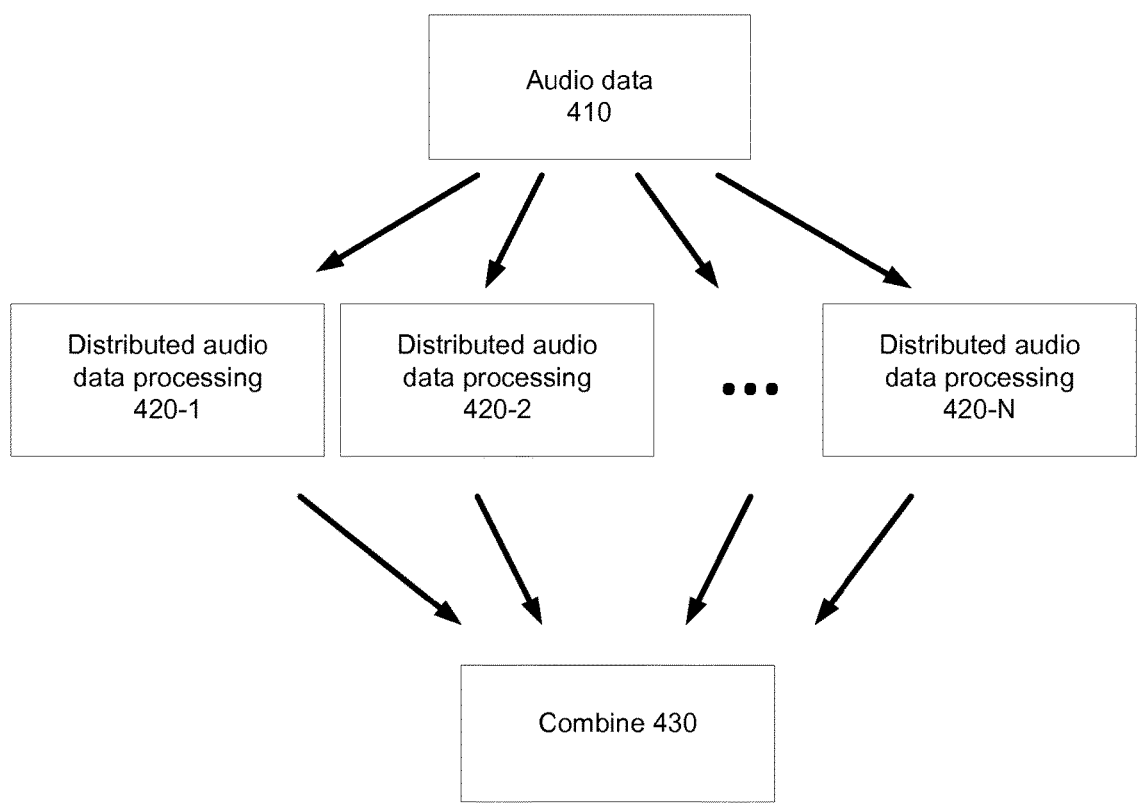
FIG. 3 illustrates an embodiment of audio data processing.

An example of the audio data processing is illustrated in FIG. 3. In FIG. 3, the audio data 410 can be segmented into N segments and processed in parallel (e.g., distributed processing 420-1 to 420-N), allowing for near real-time processing.

In some embodiments, the segmentation can be performed by a fixed period of time. In another example, quiet periods in the audio data can be detected, and the segmentation can be defined by the quiet periods. For example, the audio data can be processed and converted into a spectrum. Locations where the spectrum volatility is below a threshold can be detected and segmented. Such locations can represent silence or low audio activities in the audio data. The quiet periods in the audio data can be ignored, and the processing requirements thereof can be reduced.

Audio data and/or segments of audio data can be stored in, for example, memory or storage device discussed above. Copies of the audio segments can be sent to audio processing.

The audio data for each segment can be translated into text in parallel, for example through distributed computing, which can reduce processing time. Various audio analysis tools and processes can be used, such as audio feature detection and extraction, audio indexing, hashing and searching, semantic analysis, and synthesis.

At 430, text for a plurality of segments can then be combined. The combination can result in segmented transcripts and/or a full transcript of the audio data. In an embodiment, the topics in each segment can be extracted. When combined, the topics in each segment can be given a different weight.

The audio topics can be stored as topics for the entire video or each audio segment.

At 150, an optional step of natural language processing can be applied to the text. For example, based on dictionary, grammar, and/or a knowledge database, the text extract from the audio stream of a video can be given context, an applied sentiment, and topical weightings.

At 160, the topics generated from an image or a frame and the topics extracted from audio can be combined. The text can be cross-referenced, and topics common to both texts would be given additional weights. At 170, the video-to-content engine generates video text, such as text describing the content of the video, using the result of the combined texts and cross reference. For example, key words indicating topic and semantic that appear in both texts can be selected or emphasized. The output can also include metadata that can be time-stamped with frame references. The metadata can include the number of frames, the range of frames, and/or timestamp references.

Figure 4:
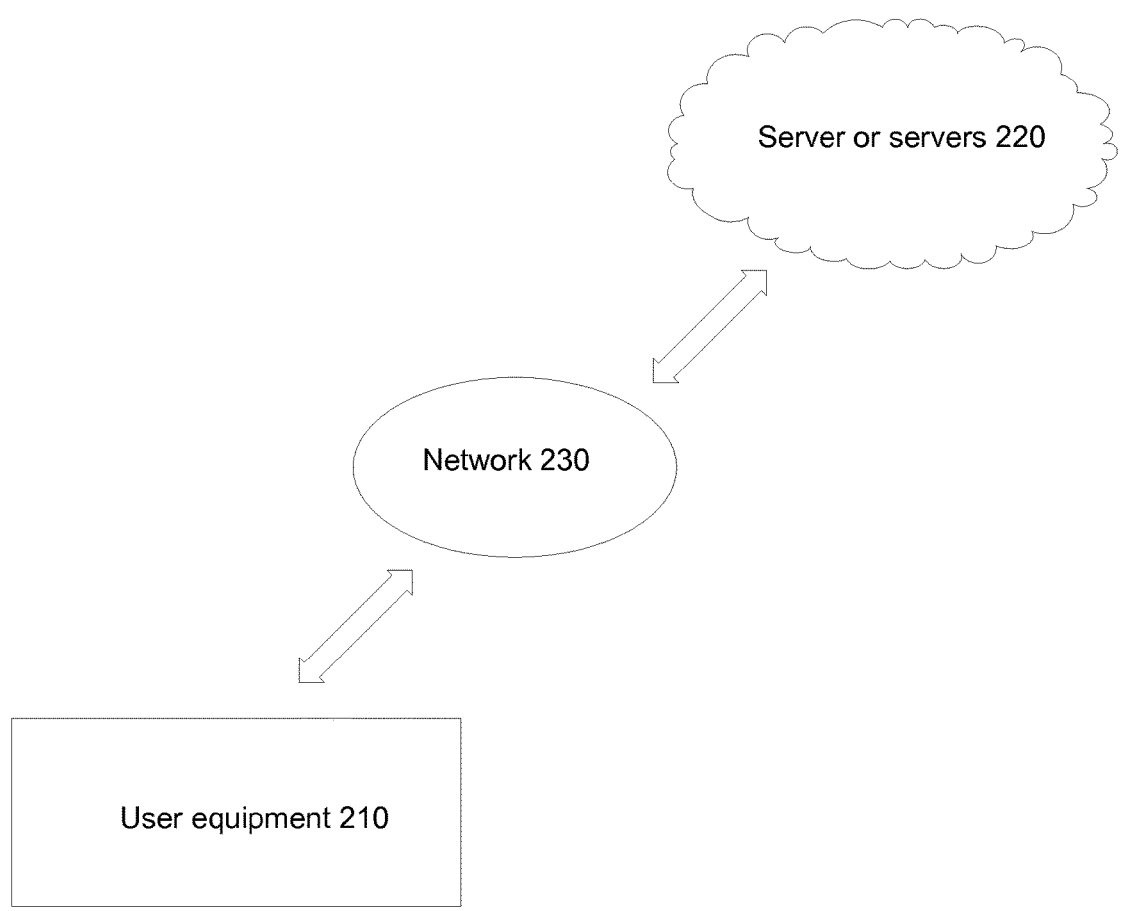
FIG. 4 illustrates another embodiment of present invention.

FIG. 4 illustrates another embodiment of the present invention. User equipment (UE) 210 can communicate with a server or servers 220 via a network 230. An exemplary embodiment of the system can be implemented over a cloud computing network.

Figure 6:
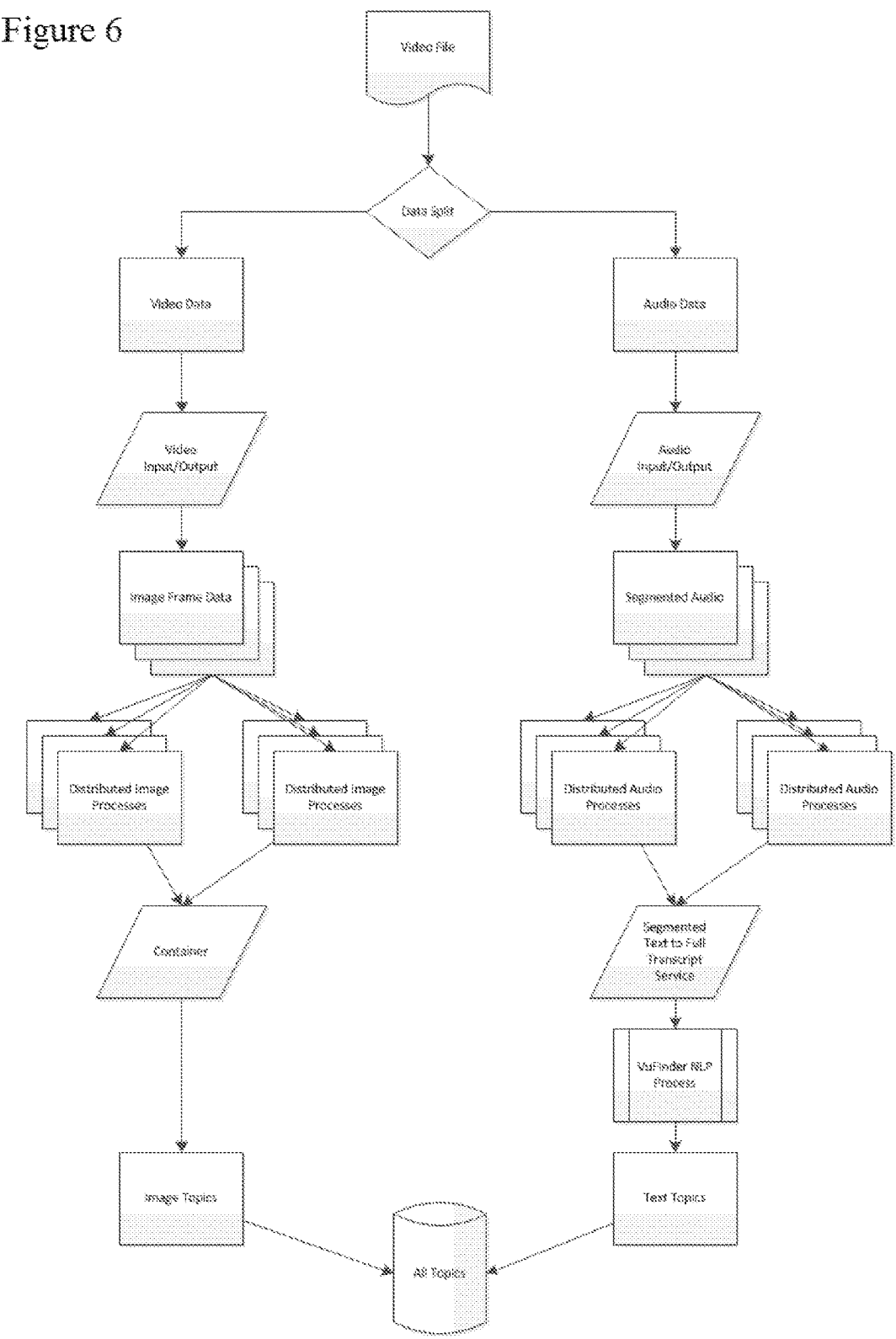
FIG. 6 illustrates a flow diagram of an embodiment

For exemplary purposes only, and not to limit one or more embodiments herein, FIG. 6 illustrates a flow diagram of an embodiment. A video file is first split into video data and audio data. A data pipeline, indicated in the figure as Video Input/Output, can extract sequences of image frames and can warehouse compressed images in a distributed data store as image frame data. A distributed computation engine can be dedicated to image pre-processing, performing e.g. corner and/or edge detection and/or image segmentation. The engine can also be dedicated to pattern recognition, e.g. face detection and/or logo recognition, and/or other analysis, such as motion tracking Processed data can be sent to one or more machines that can combine and/or sort results in a time-ordered fashion. Similarly, the Audio Input/Output represents a data pipeline for e.g. audio analysis, compression, and/or warehousing in a distributed file system. The audio can be, for example but not limited to WAV, .MP3, or other known formats. Also similarly to the video branch, a distributed computation engine can be dedicated to audio pre-processing, e.g. noise removal and/or volume adjustment, pattern recognition, e.g. transcription and/or keyword detection, and/or other analysis, e.g. identifying unique speakers. Processed audio data can be sent to one or more machines that reassemble transcript segments in their correct time-order. A time-stamped transcript can be sent through an NLP, or other preferred system or analysis, which can transform the data in time-ordered topics and/or subject matter. Both branches converge to output data from parallel video and audio pipelines. The output data can be synced into one or more machines that can combine image and audio generated topics and/or tags which can be applied towards a number of user experiences or user-defined outputs. Such experiences can include search engine optimization, video categorization, recommendation engines, advertisement targeting, content personalization, analytics, etc. The output can include metadata that is time-stamped with frame references. The metadata can include the number of frames, the range of frames, and/or timestamp references.

The UE 210 can include, for example, a laptop, a tablet, a mobile phone, a personal digital assistant (PDA), a keyboard, a display monitor with or without a touch screen input, and an audiovisual input device. In another implementation, the peripheral devices may themselves include the functionality of the general-purpose computer. For example, the mobile phone or the PDA may include computing and networking capabilities and function as a general purpose computer by accessing a network and communicating with other computer systems.

The server 220 can include the general purpose computer discussed above.

The network 230 includes, for example, the Internet, the World Wide Web, WANs, LANs, analog or digital wired and wireless telephone networks (e.g., Public Switched Telephone Network (PSTN), Integrated Services Digital Network (ISDN), and Digital Subscriber Line (xDSL)), radio, television, cable, or satellite systems, and other delivery mechanisms for carrying data. A communications link can include communication pathways that enable communications through one or more networks.

In some embodiments, a video-to-content engine can be embodied in a server or servers 220. The UE 210, for example, requests an application relating to the video stream. The servers 220 perform the audio-to-text process on the segmented audio in parallel. The distributed audio-to-text processing reduces the overall response time. This method allows real-time audio-to-text conversion.

The UE 210 communicates with the server 220 via the network 230 for video stream application. The video-to-content engine can generate the video text as illustrated in FIG. 1. The server 220 then generates advertisement (text, images, or animation) based on the video text. In some embodiments, the server adds the advertisement to a specific symbol, image, frame, or a specific time in the video stream. The specific symbol, image, frame, or the specific time in the video stream can be selected based on the video text.

The server 220 can add the audio text to the video stream in real time (i.e. real time close caption).

The server 220 can generate video recommendation based on a database of the video text. In some embodiments, the server 220 can search videos based on the video text (e.g., via a database of video text). In this fashion, video search can be optimized. Applications for the video search optimization may include search engine optimization (SEO), search engine marketing (SEM), censorship and removal materials of copyright violation.

The video streams can be videos viewed by a user, and the server 220 generates a preference profile for the user using the video data.

Figure 5:
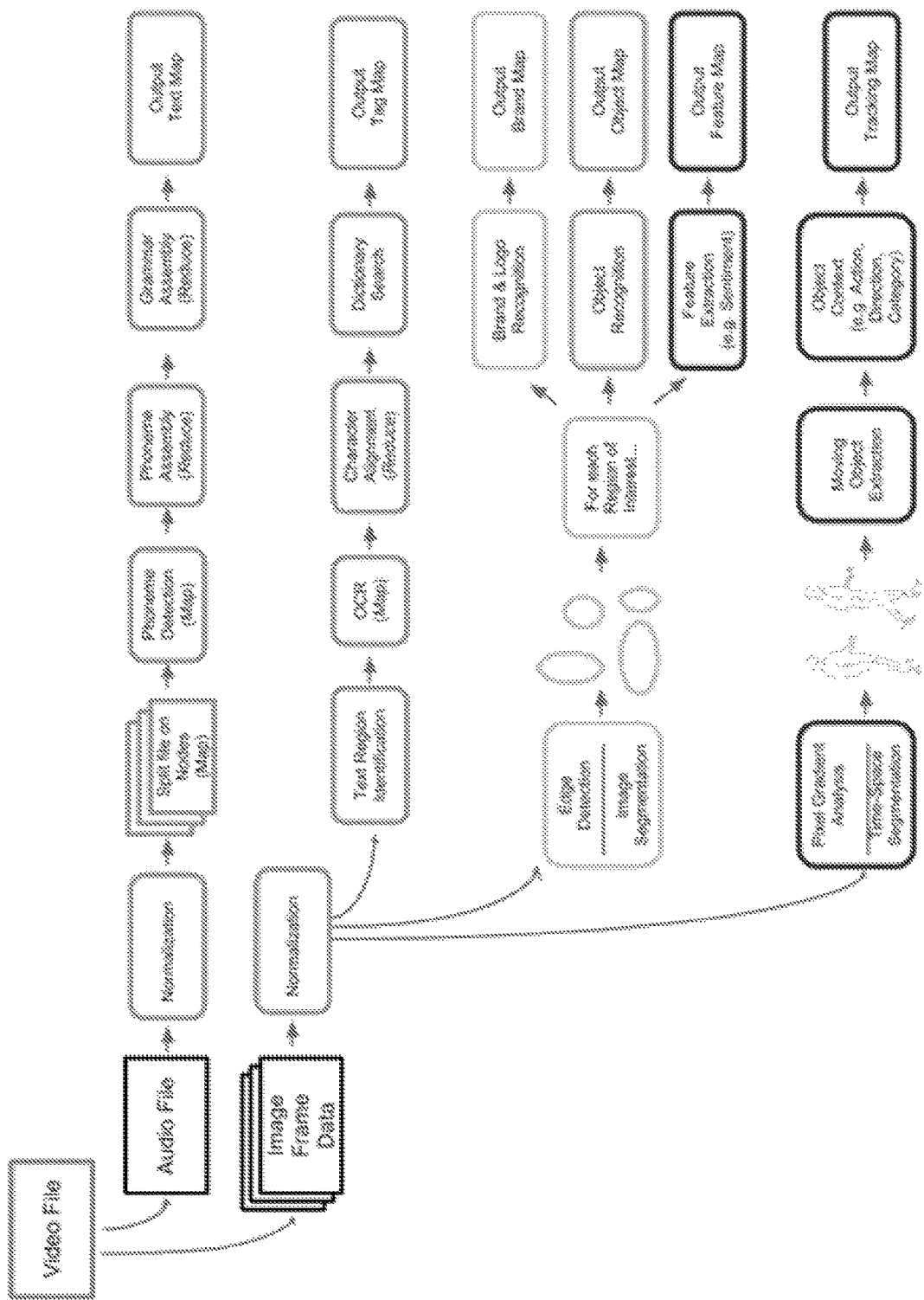
FIG. 5 illustrates various exemplary embodiments of present invention.

In an embodiment, as shown in FIG. 5 for example, a server node can fetch a video file. For example, a URL can be used to fetch the video file from an Internet such as YouTube, and from such URL the video can be scraped. The server can divide the video into chunks of smaller data files for processing on several nodes of a cluster in parallel. For example, the video file can be separated into audio files and image frame files. Each of the types of files can be normalized.

The normalized audio files can be split into constituent files for processing and reduction in parallel by various nodes. Various reduction processes can be performed on the constituent audio files such as phoneme detection and assembly as well as grammar assembly. An output of the audio processing steps can be an extracted text map.

The normalized image frame files can be processed in order to extract various data maps, such as a text map, a tag map, a brand, an object map, a feature map, and/or a tracking map. Such maps can be achieved through various extraction steps. For example, the normalized image frame files can be analyzed for text identification and/or by optical character recognition. The data can be improved through a dictionary verification step. Various maps can be created based on edge detection and/or image segmentation techniques. Such techniques can be improved by focusing on regions of interest, for example based on brands, logos, objects, and/or features of interest. Additionally, or alternatively, pixel gradients of the normalized image frame files can be analyzed and/or the files can be segmented by temporal and/or spatial components, and thus, for example, allow extraction of motion within the video images, which in turn can be used for tracking.

Identification of motion or action in a still image can be a challenge in the vision science field. However, the linear sequencing of frames from a video—as opposed to a stand-alone image—avails itself motion detection. A series of sequential frames can be analyzed in groups to identify actions, rather than merely objects, or, as a manifestation of data, verbs rather than nouns. For example, an object found across several frames can be identified and the object's motion can be determined with a high degree of accuracy. For further example, a processor can analyze a collection of x sequential frames to identify a basketball found in each frame. The processor then can analyze the motion of the basketball to determine that a basket was made by slam-dunking Or, a certain automobile may be identified in frame a, with a crashed automobile identified in frame z, with the sequential frames in between a and z identifying the action of said car crashing. The accuracy of the action-identification can be improved by utilizing contextual recognition methodologies discussed herein. For example, the probability of positively identifying a slam-dunk action can be increased if Michael Jordan is identified in the context of the video and/or images. Action identification can be further improved, in addition to modeling context of objects, by analyzing human poses, for example by building a learning set of still images capturing known actions.

Figure 7:
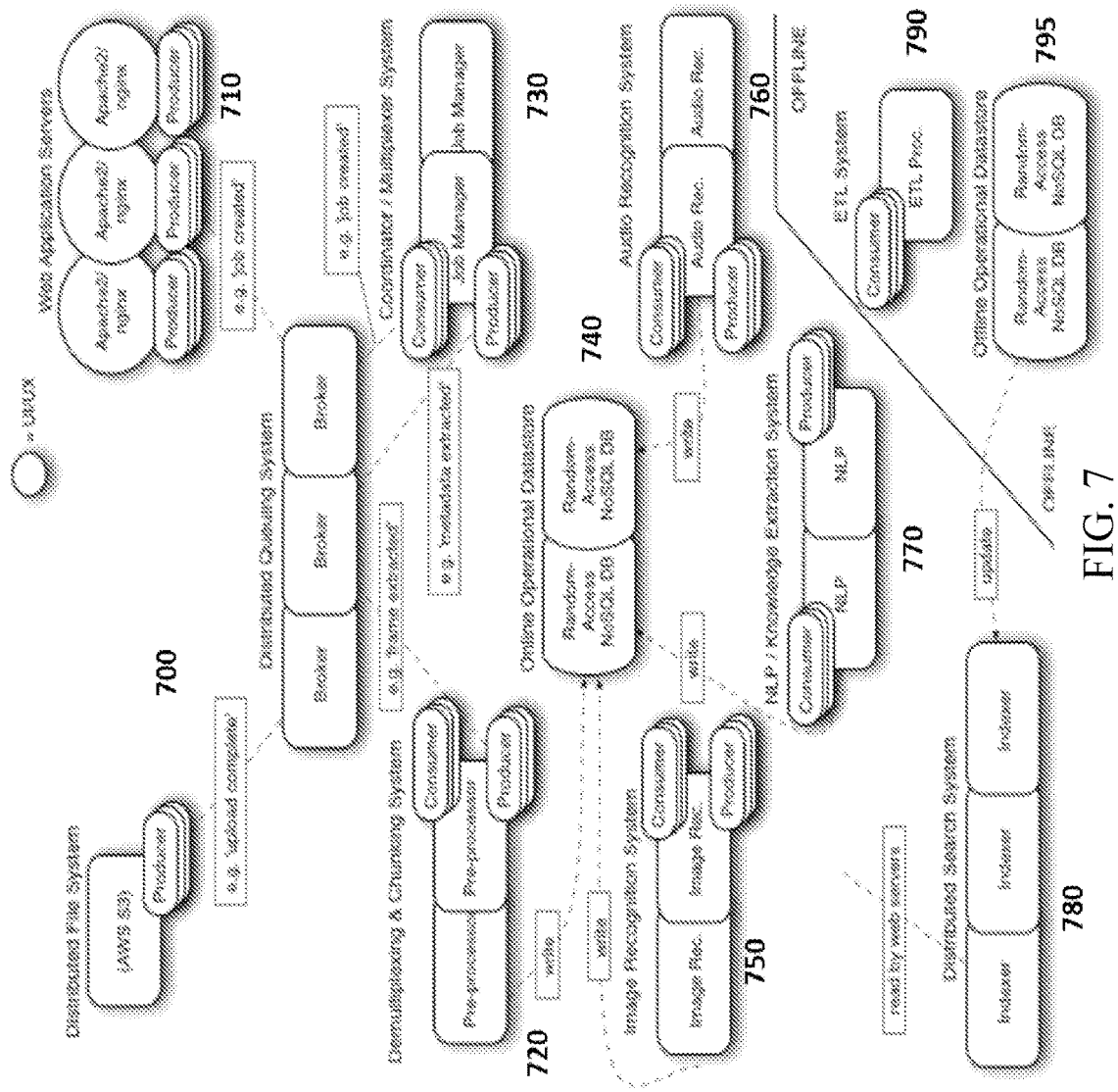
FIG. 7 illustrates an embodiment of the architecture of the present invention.

In an embodiment, as shown in FIG. 7 for example, to generate metadata, several sub-systems may operate on the video. An image recognition sub-system 750 can take frames from the video, and isolate and identify objects present in the frame. An audio recognition sub-system 760 can include automatic speech recognition, sound identification and music identification. A natural language processing (NLP) sub-system 770 can annotate and assign meaning to keywords that are generated by the image and audio sub-systems.

The automatic speech recognition (ASR) model can be a set of statistical structures and operation used for determining words from expected audio signals. The ASR model can consist of an acoustic model (AM) and a language model (LM) between which there is near perfect overlap. The acoustic model can map audio speech features to sounds/word-parts. For example, a series of features might be mapped to the ah sound in 'bath.' The language model can consist of a dictionary of known words and their phonetic mappings to sounds/word-parts and a statistical weighting of likelihood of a given word occurring given the previous one or two words. Speech may contain words and phrases not commonly used in "regular" language, e.g., double dribble, free throw, slap shot, high-sticking, etc. Accordingly, the language model can also consist of a topic-specific dictionary, with associated phonetic variants for each words, and may also consist of a statistical N-gram model of word probabilities, e.g., "slam dunk" is a common phrase but will be used more frequently in sports reporting than in general language.

The acoustic model can process audio waveforms to generate a series of speech features based on Mel-Frequency Cepstral Coefficients (MFCCs) that are generated using a series of signal processing techniques including pre-emphasis, cosine or hamming windowing, FFT, Mel-filtering, log power spectrum, DCT and the computation of delta and delta-delta coefficients. The automatic speech recognition can encompass a wide variety of tasks, e.g., connected digit recognition, dialogue systems, large vocabulary continuous speech recognition (LVCSR). Automatic speech recognition can work in part by having a statistical understanding of what words can follow other words.

The following operational sub-systems (710, 720, 730, 740, 780, 790, 795) can be utilized to support the metadata generation process. Web application servers 710 can provide clients with the ability to use the service provided by the system, e.g., upload, monitor progress and receive outcomes. A video processing sub-system 720 can transform the video file into data on which the metadata generating sub-systems operate. An auditing/coordination sub-system 730 can monitor the overall system performance, and can generate operational and business analytic data. An operational data storage sub-system 740 can store the generated metadata as well as operational and business analytic data for use in active, online processes. A search sub-system 780 can index client results, and can make them searchable via the web application. An offline data storage system 795 can hold the history of all operations performed in the system including business and operational data. An extract-transform-load (ETL) subsystem 790 can regularly write the to the offline data storage sub-system.

An architecture based on distributed message queuing and distributed data storage 700 may be utilized to build a scalable system, to optimally allocate resources for performance, to enhance failure and overload resiliency. A distributed message queuing system may produce data that gets delivered to a particular queue at which time it gets consumed by a component that watches that queue. The distributed queuing system can be removed.

Figure 8:
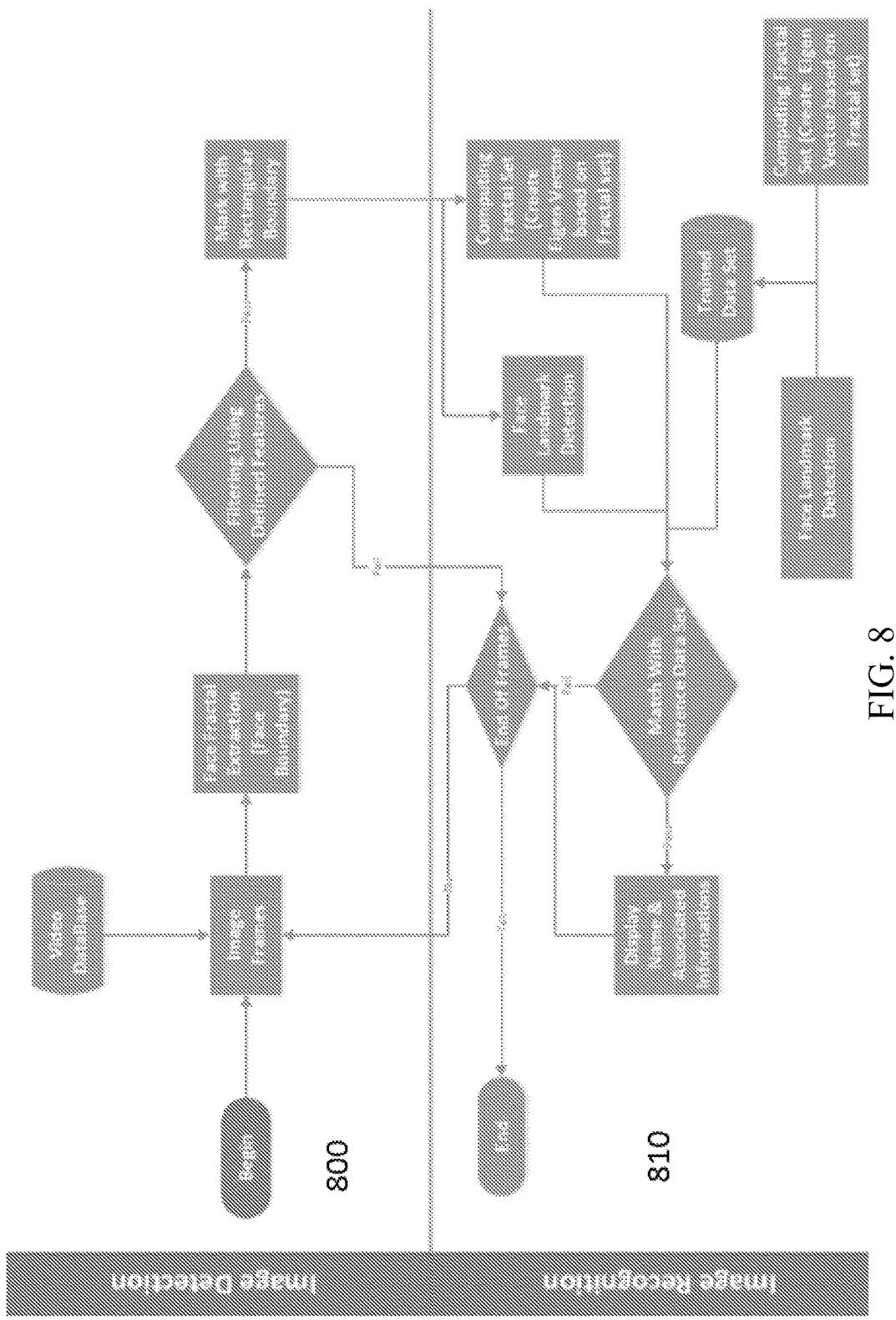
FIG. 8 illustrates a flow diagram of an embodiment of image recognition.

For exemplary purposes only, and not to limit one or more embodiments herein, FIG. 8 illustrates a flow diagram of an embodiment of image recognition. The images can be classified as faces and objects, and typically an image can contain faces and objects.

Image recognition can include two components: image detection 800 and image recognition 810. Image detection can be utilized to determine if there is a pattern or patterns in an image that meet the criteria of a face, image, or text. If the result is positive, the detection processing then moves to recognition. All fractal computations can occur in recognition. Recognition processing can include creating a fractal representation of the face or object that was detected, performing a match to an existing database of faces and objects, and assigning a value (name) to the face or object and then returning to the requesting program.

The system can utilize facial recognition algorithms to identify facial fractals by extracting landmarks from an image of the subject's face. For example, the algorithm may analyze the relative position, size, and/or shape of the eyes, nose, cheekbones, and jaw. These features can then be used to search for other images with matching features. Other algorithms can normalize a gallery of face images and then compress the face data, only saving the fractal data in the image that is useful for face recognition. A probe image can then be compared with the face data. Recognition algorithms can be divided into two main approaches, geometric, which looks at distinguishing features, or photometric, which is a statistical approach that distills an image into values and compares the values with templates to eliminate variances.

The recognition algorithms may include Principal Component Analysis using Eigen faces, Linear Discriminate Analysis, Elastic Bunch Graph Matching using the Fisherface algorithm, the Hidden Markov model, the Multi-linear Subspace Learning using tensor representation, and the neuronal motivated dynamic link matching. A hybrid using fractal genesis can be constructed to detect the face with elements described above.

Three-dimensional face recognition can also be used. This technique can use 3D sensors to capture fractal information about the shape of a face. This information can then be used to identify distinctive features on the surface of a face, such as the contour of the eye sockets, nose, and chin.

One advantage of 3D facial recognition is that it is not affected by changes in lighting like other techniques. It can also identify a face from a range of viewing angles, including a profile view. Three-dimensional data points from a face vastly improve the precision of facial recognition.

To improve the accuracy of detection, the hybrid can also use the visual details of the skin, as captured in standard digital or scanned images. This technique, called skin texture analysis, turns the unique lines, patterns, and spots apparent in a person's skin into a mathematical fractal space. Tests have shown that with the addition of skin texture analysis, performance in recognizing faces can increase 20 to 25 percent.

The following recognition models may be utilized:

PCA: Derived from Karhunen-Loeve's transformation. Given an s-dimensional vector representation of each face in a training set of images, Principal Component Analysis (PCA) tends to find a t-dimensional subspace whose basis vectors correspond to the maximum variance direction in the original image space. This new subspace is normally lower dimensional ($t \ll s$). If the image elements are considered as random variables, the PCA basis vectors are defined as eigenvectors of the scatter matrix.

Linear Discriminant Analysis (LDA): finds the vectors in the underlying space that best discriminate among classes. For all samples of all classes the between-class scatter matrix SB and the within-class scatter matrix SW are defined. The goal is to maximize SB while minimizing SW, in other words, maximize the ratio det|SB|/det|SW|. This ratio is maximized when the column vectors of the projection matrix are the eigenvectors of (SW^-1×SB).

Aa eigenspace-based adaptive approach: searches for the best set of projection axes in order to maximize a fitness function, measuring at the same time the classification accuracy and generalization ability of the system. Because the dimension of the solution space of this problem is too big, it is solved using a specific kind of genetic algorithm called Evolutionary Pursuit (EP).

Elastic Bunch Graph Matching (EBGM): All human faces share a similar topological structure. Faces are represented as graphs, with nodes positioned at fiducial points. (exes, nose . . . ) and edges labeled with 2-D distance vectors. Each node contains a set of 40 complex Gabor wavelet coefficients at different scales and orientations (phase, amplitude). They are called "jets". Recognition is based on labeled graphs. A labeled graph is a set of nodes connected by edges, nodes are labeled with jets, edges are labeled with distances.

Kernel Methods: The face manifold in subspace need not be linear. Kernel methods are a generalization of linear methods. Direct non-linear manifold schemes are explored to learn this non-linear manifold.

Trace transform: A generalization of the Radom transform, is a new tool for image processing which can be used for recognizing objects under transformations, e.g. rotation, translation and scaling. To produce the Trace transform one computes a functional along tracing lines of an image. Different Trace transforms can be produced from an image using different trace functional.

3-D Morphable Model: Human face is a surface lying in the 3-D space intrinsically. Therefore the 3-D model should be better for representing faces, especially to handle facial variations, such as pose, illumination etc. Blantz et al. proposed a method based on a 3-D morphable face model that encodes shape and texture in terms of model parameters, and algorithm that recovers these parameters from a single image of a face.

Bayesian Framework: A probabilistic similarity measure based on Bayesian belief that the image intensity differences are characteristic of typical variations in appearance of an individual. Two classes of facial image variations are defined: intrapersonal variations and extrapersonal variations. Similarity among faces is measures using Bayesian rule.

Hidden Markov Models (HMM): These are a set of statistical models used to characterize the statistical properties of a signal. HMM consists of two interrelated processes: (1) an underlying, unobservable Markov chain with a finite number of states, a state transition probability matrix and an initial state probability distribution and (2) a set of probability density functions associated with each state.

Fractal Genesis (Hybrid): The image intensity differences are characteristic of typical variations in appearance of an individual. Human face is a surface lying in the Fractal space intrinsically. Since most of the parameters are self-similar, the Fractal model should be better for representing faces, especially to handle facial variations, such as pose, illumination etc. A Hybrid, wherein many proponents of other algorithms are integrated to form a fractal genesis.

An advantage of present embodiments includes the ability to provide real-time or faster-than-real-time content output. This can be achieved through one or more components and/or steps. For example, a video file can be distributed across at least two layers for processing. The audio can be converted to text on at least one layer, and the images can be processed on at least one other layer. In some embodiments, natural language processing can abstract topics, sentiments, temporal topic-tagging, and can be used for further optimization and/or machine learning. The layers can include node clusters for parallel processing chunks of the video file into the preferred content. In some embodiments, the files can be maintained and processed in parallel at each step, and then combined into a single data file as one of the terminal processing steps.

Present embodiments have wide application. For example, video indexing, reverse image lookup, video co-groupings and graph searches, and video similarity indexing, as described herein, can be used for searching, for classification, and for recommendations regarding processed videos. Law enforcement and security industries can implement embodiments for object recognition and motion detection. Media, entertainment, and industrial entities can implement embodiments to monitor for trademark infringement, captioning, advertising and targeting, brand and product monitoring and data collection, and marketing analytics. These exemplary implementation are not intended to be limiting, merely exemplary.

Additionally, or alternatively, to actively fetching and scraping a video, the system and method can be automated as a push system and/or a web crawling system. For example, the server can monitor or online content of specific providers, such as YouTube, Vimeo, the growing myriad of video-content creating websites, or other online video providers. Monitoring of published videos can be tailored to search for extracted data relevant to specific requesters. For example, a purveyor of certain products can be apprised in real-time of new content relevant to the products. Such relevant content can include the context in which the products are found in the video, the appearance of competing products, verification of product placement, and other useful information.

All of the methods disclosed and claimed herein can be made and executed without undue experimentation in light of the present disclosure. While the apparatus and methods of this invention have been described in terms of preferred embodiments, it will be apparent to those of skill in the art that variations may be applied to the methods and in the steps or in the sequence of steps of the method described herein without departing from the concept, spirit and scope or the invention. In addition, from the foregoing it will be seen that this invention is one well adapted to attain all the ends and objects set forth above, together with other advantages. It will be understood that certain features and sub-combinations are of utility and may be employed without reference to other features and sub-combinations. This is contemplated and within the scope of the appended claims. All such similar substitutes and modifications apparent to those skilled in the art are deemed to be within the spirit and scope of the invention as defined by the appended claims.

The invention claimed is:

1. A method to generate video data from a video comprising:

generating audio files and image files from the video;
distributing the audio files and the image files across a plurality of processors and processing the audio files and the image files in parallel;
converting audio files associated with the video to text;
identifying an object in the image files;
determining a contextual topic from the image files;
assigning a probability of accuracy to the identified object based on the contextual topic;
converting the image files associated with the video to video data, wherein the video data comprises the object, the probability, and the contextual topic;
cross-referencing the text and the video data with the video to determine contextual topics;
generating a contextual text, an image, or an animation based on the determined contextual topics;
generating a content-rich video based on the generated text, image, or animation.

2. The method according to claim 1, further comprising: applying natural language processing to the text to determine context associated with the video.

3. The method according to claim 1, further comprising: applying natural language processing to the text to extract a topic.

4. The method according to claim 1, further comprising: processing the image files to extract additional text.

5. The method according to claim 4, wherein the additional text is generated by segmenting the image files before processing the image files in parallel.

6. The method according to claim 1, further comprising: processing the image files to extract an object and determine a motion associated with the object.

7. The method according to claim 1, wherein the text is generated by segmenting the audio before processing the audio files in parallel.

8. The method according to claim 6, wherein the audio files and the image files are segmented at spectrum thresholds.

9. The method according to claim 1, further comprising: generating an advertisement based on the text and the video data.

10. The method according to claim 9, further comprising: placing the advertisement in the video at a preferred time.

11. The method according to claim 1, further comprising: generating metadata.

12. The method according to claim 11, wherein the metadata comprises a number of frames, a range of said frames and/or timestamp references.

13. A system for extracting data from a video, comprising:
a computer processor; and
a non-transitory computer readable medium containing instructions directing the system to execute the steps of:
converting audio associated with the video to text;
converting images associated with the video to video data, wherein the video data comprises identified objects;
extracting topics from the text and the video data;
assigning probabilities of accuracy for each of the identified objects, wherein the probabilities are based on the extracted topics;
cross-referencing the text, the video data, and the topics with the video to determine contextual topics;
generating a contextual text, an image, or an animation based on the determined contextual topics; and
generate a content-rich video based on the generated contextual text, image, or animation.

14. The system according to claim 11, wherein converting the audio comprises natural language processing.

15. The system according to claim 11, the computer directs the audio to be converted by at least one node of a cluster and the computer directs the images to be converted by at least one other node of the cluster in parallel.

16. The server according to claim 11, wherein the audio and the images are segmented at spectrum thresholds.

17. The system according to claim 13, wherein the computer directs the system to generate metadata.

18. The system according to claim 13, wherein the metadata comprises a number of frames, a range of said frames and/or timestamp references.

* * * * *